Figure 13:
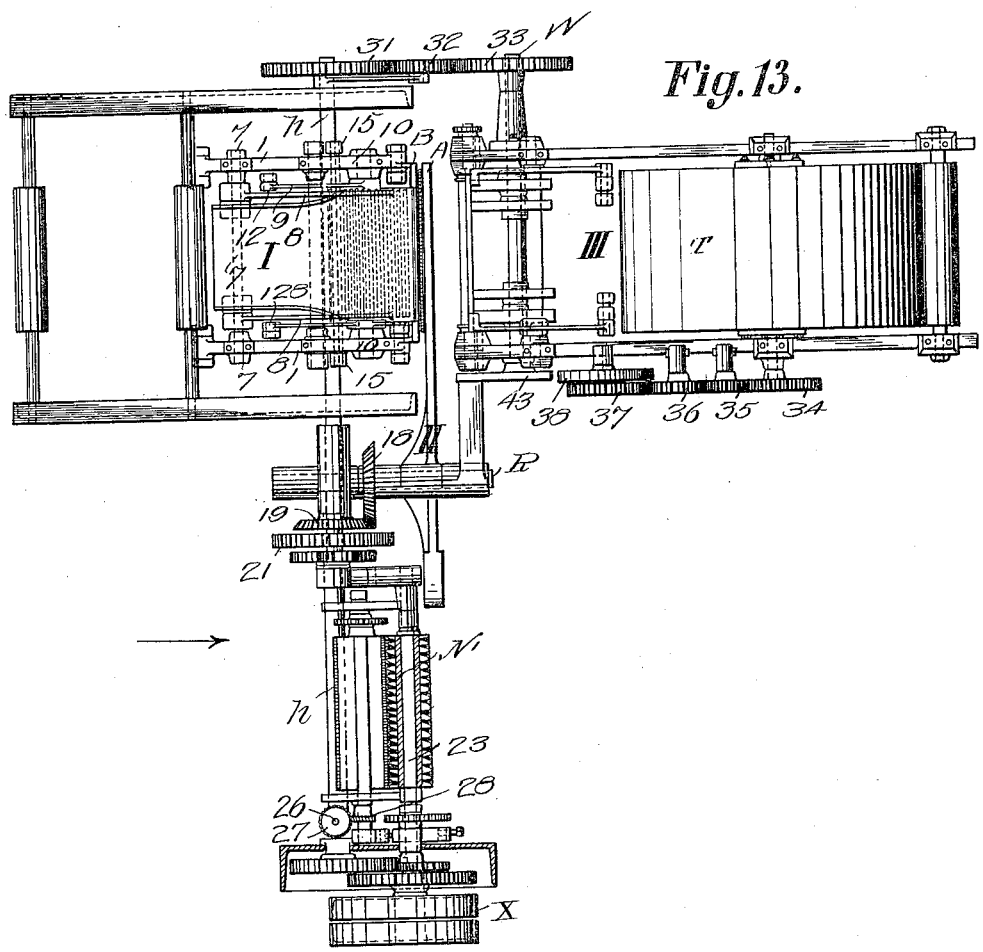

C. SCHLEIFER.
COMBING MACHINE.
APPLICATION FILED MAY 9, 1911.
1,129,737.
Patented Feb. 23, 1915.
6 SHEETS—SHEET 1.
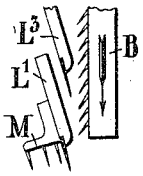
Fig.1.
Fig.2.
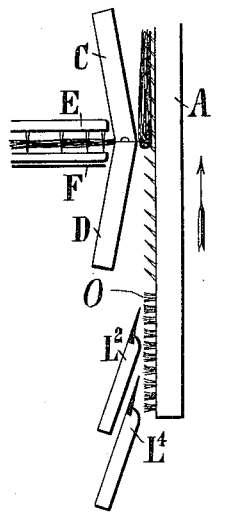
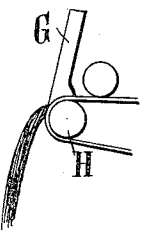
Fig.3.
Fig.4.
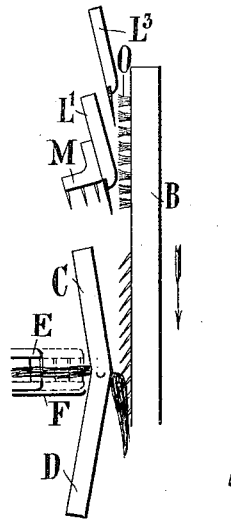
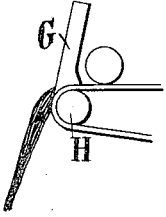
WITNESSES
Sidney Brooks
W. Harrison
INVENTOR
Carl Schleifer
BY Munn & Co.
ATTORNEYS

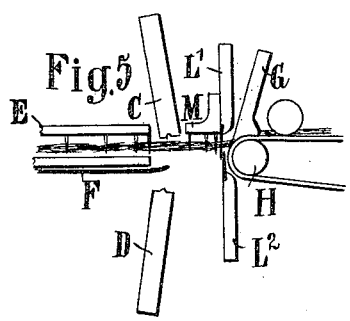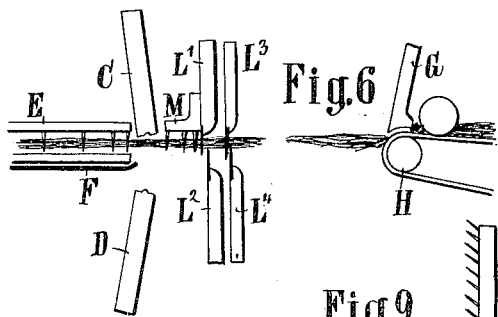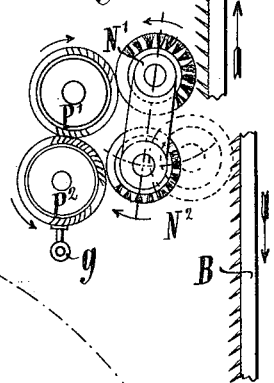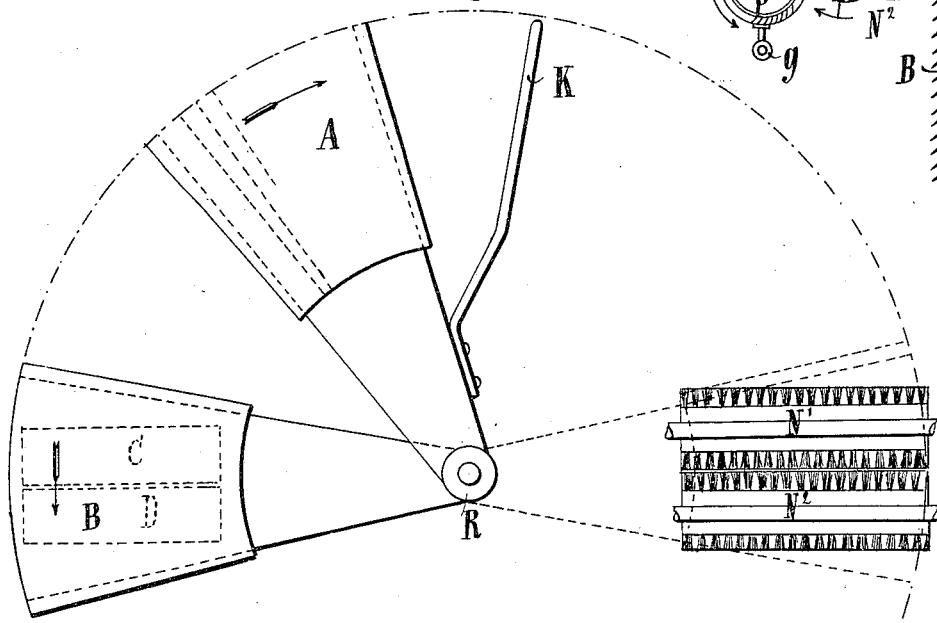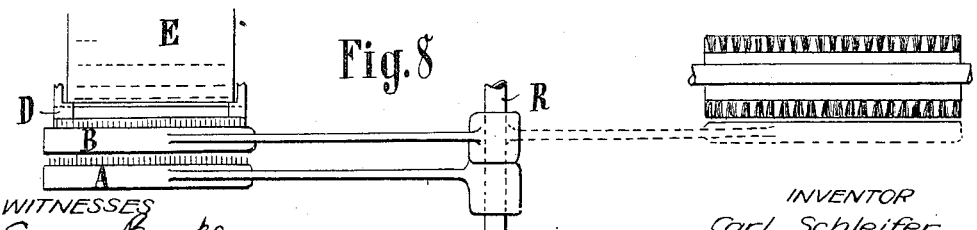

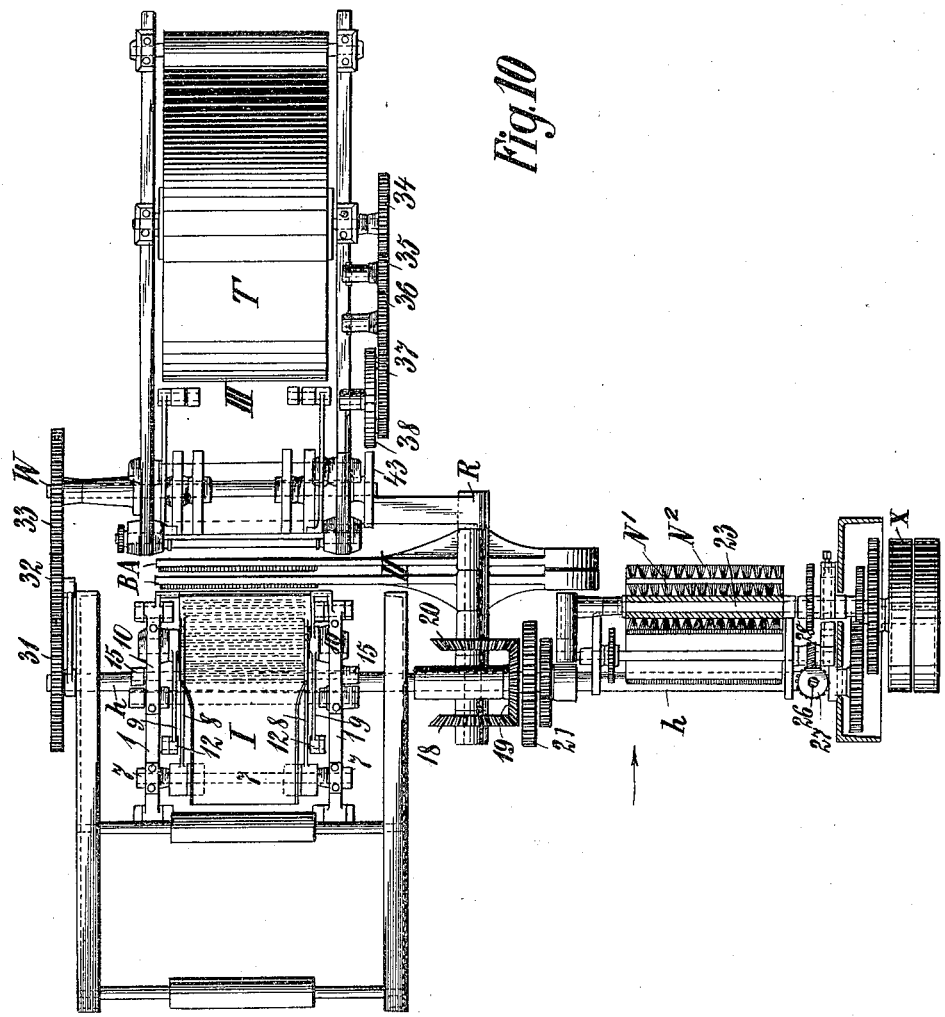

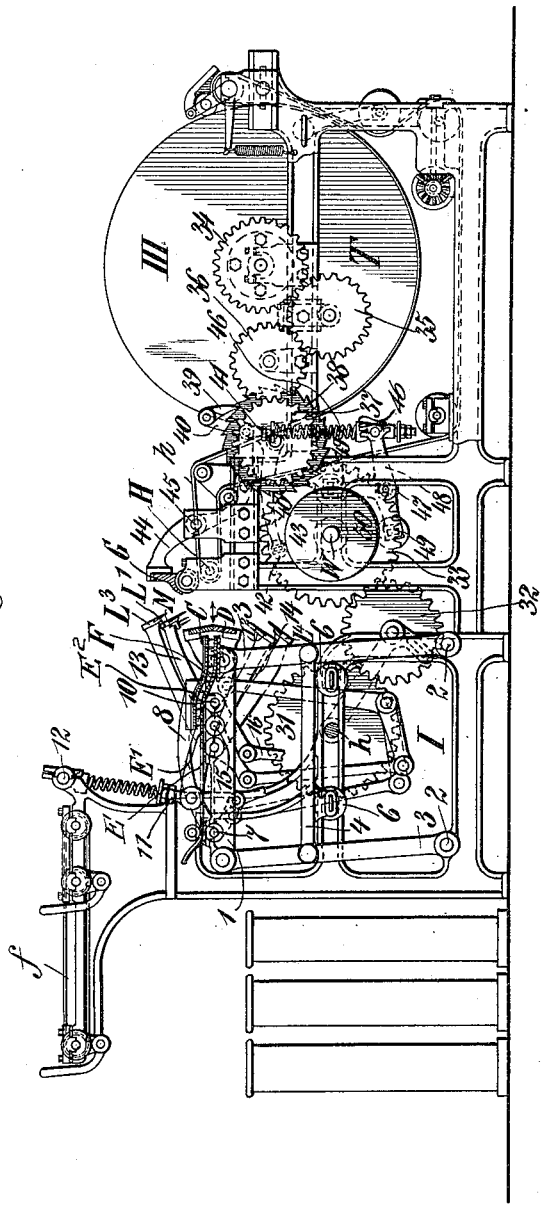

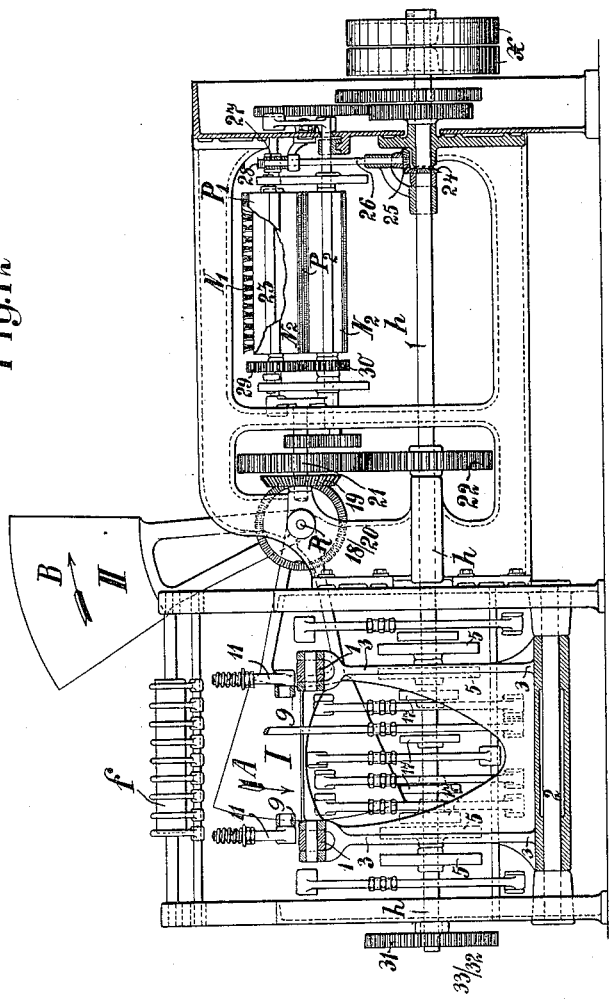

UNITED STATES PATENT OFFICE.

CARL SCHLEIFER, OF PEROSA, ITALY, ASSIGNOR TO THE FIRM OF GÜTERMANN & CO., OF PEROSA, ITALY.

COMBING MACHINE.

1,129,737.      Specification of Letters Patent.      Patented Feb. 23, 1915.

Application filed May 9, 1911. Serial No. 625,966.

*To all whom it may concern:*

Be it known that I, CARL SCHLEIFER, a subject of the Emperor of Austria-Hungary, residing at and whose post-office address is Perosa, Argentina, Italy, have invented certain new and useful Improvements in Combing Machines; and I do hereby declare the nature of this invention to be particularly described and ascertained in and by the following specification.

My invention relates to a combing machine for wool, flax and all the like by which the material to be combed is held by gripping jaws and presented to the comb, whereupon the resulting combed sliver is seized by an apparatus for pulling off and is drawn out of the opened jaws. It has heretofore been the practice to employ in such combing machines two combs lying in parallel planes, one comb acting upon the sliver while moving upward, the other while moving downward. According to my invention the combs alternately are brought in front of the jaws holding the sliver. This is done in such manner, that either the gripping jaws are fixed and the combs are shifted or the combs are fixed and the gripping jaws are shifted. The combs are flat and of sectional or fan shaped form and they are fixed on a shaft which is arranged sidewise and parallel to the direction in which the sliver is fed and drawn off so that in combing the sliver, the comb is rotating in a complete circle. To obtain a careful and economical combing out, pairs of picking combs are provided, picking one after the other always on the same place in the sliver, which is held by the pulling off mechanism while the gripping jaws are moving back. A needle plate is arranged on the side of the first picking comb, and is turned to the gripping jaws so that it enters at the same time into the sliver and holds the short fiber when the latter are no longer supported by the feed box.

Reference is to be had to the accompanying drawings forming a part of this specification, in which like characters of reference indicate corresponding parts in all the views, and in which—

Figure 1 is a fragmentary elevation showing one of the combs arranged to pick the sliver as the comb ascends. Fig. 2 is a fragmentary elevation showing how the sliver is picked by a comb as the latter descends. Fig. 3 is a view somewhat similar to Fig. 2, but showing the same comb in a little more advanced position. Fig. 4 shows the means whereby the sliver is drawn out from the feed-box. Fig. 5 is a fragmentary elevation somewhat similar to Fig. 4, but showing the sliver in a position still farther advanced on the feed-box. Fig. 6 is a fragmentary elevation showing in detail how the sliver is handled after leaving the feed-box. Fig. 7 is a fragmentary elevation showing the form of the turning combs and the brushes for taking off the short combed fibers. Fig. 8 is a plan view of the mechanism shown in Fig. 7. Fig. 9 shows the various revolving brushes used for removing material from the teeth of the combs. Fig. 10 is a plan view of the whole machine. Fig. 11 represents a side elevation, the segmentary combs being left out. Fig. 12 illustrates the combing machine seen in the direction of the arrow shown in Fig. 10; where the pulling off-head is not illustrated and the front swing arms are partly represented in section and Fig. 13 is a plan view of the whole machine with only one comb, a simplification of the construction according to Fig. 10.

The new combing machine essentially consists of three parts: the feeding head I, the segment comb-mechanism II, and the pulling off-head III. Besides an endless conveyer-strap $f$, the feeding head comprises the feeding device E, the gripping jaws C D, the two pairs of picking combs $L^1 L^2$, $L^3 L^4$ (Fig. 11). The feeding device, the gripping jaws and the combs are disposed on a swing frame composed of two plates 1 upon which the said parts are mounted, the swing arms 3 pivoted to the plates 1 and at 2 to the frame and the traverse bar 4 pivoted to the arms 3. The frame is reciprocated by the main shaft $h$ by means of the eccentric 5 and rolls 6 so that the swing frame may be moved to and fro in the desired manner (Figs. 11 and 12). The feeding device E is composed of a suitably bent base plate $E^1$ supported by the plates 1 and a movable needle plate $E^2$, which is attached to the lever arm 8 mounted on the shaft 7. Under the feeding device a plate F of sheet metal is provided, which facilitates the conveyance of the combed sliver to the pulling off-device.

The gripping jaws C D suitably disposed upon the swing frame are formed usually by an upper stationary gripping jaw C and a lower movable gripping jaw D carried by the two armed lever 9 mounted to oscillate on the pivot 10. The rear end of the oscillating lever 9 is pivoted to a bar 11, which is provided with a spiral spring and said bar is pivotally attached at the point 12 to the frame (Figs. 11 and 12). By moving the swing frame 1, 3, 4 forward and backward the gripping jaw D is opened or closed by the said lever (Fig. 11). The picking combs $L^1$, $L^2$ moving and coacting before the gripping jaws, are fastened to the two-armed symmetrical swing levers 13 and 14, mounted on the shaft 15 and provided at their ends with articulated bars 16, the said bars again being journaled by angle levers, not shown in the drawings, which carry at their other ends rolls engaging eccentrics 17 of the main driving shaft $h$ (Fig. 12). By rotation of the eccentrics 17 the picking combs $L^1$, $L^2$ are actuated. To the upper picking comb $L^1$ is fixed a small needle plate M, which retains the short fibers being no longer held by the feeding device E during the pulling off-process. The front picking combs $L^3$ and $L^4$ are arranged in a similar manner as the combs $L^1$ and $L^2$. The picking combs are cleaned in their upper and lower resting positions by the brushes O attached to the comb segment plates A and B behind the needles (Figs. 1 and 3). In front of the gripping jaws C, D, the two flat segment combs A and B are arranged, the comb A being provided with needles or teeth directed upward while the needles or teeth of the comb B are directed downward (Figs. 1, 3, 10). The comb segment A is keyed upon the shaft R, which carries at its end a bevel gear wheel 18 engaging a bevel gear wheel 19 (Fig. 10), supported by a pivot mounted on the frame.

The bevel gear wheel 19 is in gear with a bevel gear wheel 20, which is loosely mounted on the shaft R and rotating in a direction opposite to the gear wheel 18. The bevel gear wheel 20 carries an elongated hub in the form of a sleeve, on which the comb segment B is fixed (Fig. 10). With the bevel gear wheel 19 is connected a spur wheel 21, which gears with a wheel 22 placed upon the main driving shaft $h$. The said shaft is connected with the driving pulley X by means of a suitable gearing (Figs. 10 and 12).

The roller brushes $N^1$ and $N^2$ rotating on the shaft 23 are adapted to clean the flat needle plates attached to the rotating comb segments A and B. The roller brushes deliver the noils to the doffing rollers $P^1$ and $P^2$ provided with wire hooks. From these rollers the short fibers are drawn off by the doffing knife $g$. The doffing roller $P^1$ is driven by the main shaft $h$ by means of the bevel gear wheels 24, 25, the vertical intermediate shaft 26, the worm 27, and the worm wheel 28 (Fig. 12). The doffing roller $P^1$ rotates the other doffing roller $P^2$ by the gear wheels 29 and 30. The roller brushes $N^1$ and $N^2$ are operated by the driving pulley X by means of an intermediate gearing. The main driving shaft $h$ carries at the side opposite to the driving means, outside of the frame, a spur wheel 31, meshing with a gear wheel 32 which in turn meshes with the gear wheel 33 placed upon the driving shaft W of the pulling off-head III (Figs. 10–12).

The pulling off device G, H consists of an endless leather strap $h$ running about the roller H and winding around the lower part of the drum T and the gripping jaw G. The drum T carries on its shaft end a gear wheel 34 which is geared with the gear wheel 37 through the intermediate gears 35 and 36. With the wheel 37 is connected a ratchet wheel 38, with which a pawl 39 at the end of the angle lever 40 engages (Fig. 11). The angle lever mounted on the pivot 41 is provided at its end with a roll 42 engaging an eccentric 43 on the shaft W (Figs. 10 and 11). By rotating the eccentric the angle lever is oscillated, which causes the forward rotation of the ratchet wheel and the intermittent movement of the drum and the leather strap. The gripping jaw G is fixed to a lever 44 mounted on the shaft 45; the lever 44 is pivotally connected with a lever 48 through a spring bar 46. The lever 48 mounted on the fixed pivot 47 is provided with two rolls 49, which engage eccentrics 50 on the shaft W so as to impart a swinging motion to the lever 44 and gripping jaw G.

The working of the machine is as follows: When the gripping jaws C, D (Fig. 1) are closed, the sliver is combed out by the comb A, moving upward and passing immediately in front of the gripping jaws. When the comb A has passed the jaws C, D, the jaws are moved forward, until they come to the working plane of the comb B (Fig. 2). By this comb the sliver is now combed in a direction (Fig. 3) from above to below, contrary to the movement of comb A. The feed-box E is moved back and is closed. The combs A and B, in their farther movement (Fig. 8) contact slightly with the brushes $N^1$ $N^2$ rotating with higher speed than the combs A, B. These brushes take off the noils and impurities and deliver it to the rollers $P^1$ and $P^2$ and to the doffing knife $g$, as described before. When the combs A, B have combed the sliver, the gripping jaws C, D are further moved forward and opened, so that the rear end of the sliver is released, yet still advanced by the feed-box E against the pulling off mechanism (Fig. 4). Before the gripping jaws cease to move forward the thin plate F is advanced, straightening the combed front side of the sliver and delivering it to the roller H of the pulling off apparatus on which is still lying the sliver combed in the preceding working period. As the jaw G is raised and the roller H begins to rotate the sliver is moved forward. When the gripping jaws C, D have reached the end of their movement, the plate F is moved back. The feeding being finished, the jaw G of the pulling off mechanism is pressed down and the front side of the sliver is caught (Fig. 5). Now the jaws C, D move back, and the picking combs $L^1$ and $L^2$ and also the needle plate M pick into the sliver, and as they move back with the gripping jaws, they carry away the fibers, which are not held by the pulling off mechanism, and comb with their big needles the fibers, the front ends of which are held by the pulling off mechanism G H. While swinging back farther the finer needle shafts $L^3$ $L^4$ pick alternately into the sliver, and then the shafts move back with the gripping jaws. The needles of these combs progressively increase in fineness and of course they comb out the sliver in the best manner. At the same time the little needle plate M together with the needle shaft $L^1$ has picked into the sliver and holds the short fibers, which are no longer caught by the feed-box E (Fig. 6). A short time before the swinging back movement is finished, the gripping jaws are closed. The needle shafts $L^1$, $L^2$, $L^3$, $L^4$ return to their first position, where they are cleaned by the brushes O attached to the comb segments A and B (Fig. 1) and the working now is repeated as above described. It is to be understood that for combing very long stapled material, the swinging motion of the gripping jaws and picking combs will have to be increased. To keep the motion in certain limits an arm K may be attached on the segment as shown in Fig. 7, to pull the sliver through the needle shafts L at the proper time during the return movement of the gripping jaws C, D. In some instances a single fan shaped comb may be employed, as shown in Fig. 13. The construction according to Fig. 13 is a simplification according to Fig. 10, which consists in the following: The comb B and the bevel gear wheel 20 fixed thereto and which are loosely mounted on the shaft R are omitted and therefore likewise the shifting mechanism of the gripping jaws to this comb. The bevel gear wheel 18 is mounted on the shaft adjacent to the comb A and only one roller brush N′ (Figs. 9 and 10) is employed.

I claim,

1. In a combing machine, the combination of alternately opened and closed gripping jaws and a flat comb provided on one side with needles arranged in a plurality of rows, said comb rotating in a full circle, the plane of rotation being at a right angle to the direction in which the sliver is fed to the gripping jaws, and means for removing the combed sliver from the opened gripping jaws during the travel of the rotating comb through the portion of its circle of rotation opposite the position of said jaws.

2. In a combing machine, the combination of alternately opened and closed gripping jaws and a flat comb of longitudinal form provided on one side with needles arranged in a plurality of rows, said comb rotating in a full circle, the plane of rotation being at a right angle to the direction in which the sliver is fed to the gripping jaws, and means for removing the combed sliver from the opened gripping jaws during the travel of the rotating comb through the portion of its circle of rotation opposite the position of said jaws.

3. In a combing machine, the combination of gripping jaws and a pair of flat combs, each of said combs being provided on one of its sides with several rows of needles, the needles of one comb being inclined in one direction, and those of the other comb being inclined in another direction, means for rotating the combs in a plane at right angles to the direction in which the sliver is fed and drawn off, and means for bringing said gripping jaws adjacent to one of said combs while the latter is making its upward movement and for bringing said gripping jaws adjacent to the other of said combs while the latter is making its downward movement.

4. In a combing machine, the combination of gripping jaws and a pair of flat combs, each provided on one side with rows of needles, the needles carried by one comb being inclined in one direction and the needles carried by the other comb being inclined in another direction, means for supporting said combs in order to allow the same to rotate in a plane at right angles to the direction in which the sliver is fed and drawn off, and means for bringing said gripping jaws to a point adjacent to one of said combs and thence moving said gripping jaws to a point adjacent to the other of said combs.

5. In a combing machine, the combination of gripping jaws and a pair of flat combs mounted to rotate in a plane at right angles to the direction in which the sliver is fed and drawn off, each of said combs being provided on one of its sides with needles, the needles carried by one comb extending in a direction different from the direction of the needles carried by the other comb, and means for bringing a sliver into engagement with one of said combs during a movement of the latter in one direction and for moving said sliver into engagement with the other during a movement thereof in the opposite direction.

6. In a combing machine, the combination of gripping jaws and a pair of flat combs, each provided with needles, the needles of one comb extending in one direction and the needles of the other comb extending in a different direction, means for rotating the combs in a plane at right angles to the direction in which the sliver is fed and drawn off, and means for shifting said gripping jaws to two different points alternately, one of said points being adjacent to one of said combs and the other of said points being adjacent to the other comb.

7. In a combing machine, the combination of gripping jaws, a plurality of combs coacting therewith, said combs rotating in a plane at right angles to the direction in which the sliver is fed and drawn off, a set of picking members, means for moving said picking members and said gripping jaws at the same time, and a device for pulling off the sliver and for supporting the same adjacent the path of travel of said picking members.

8. In a combing machine, the combination of gripping jaws and a pair of combs coacting therewith, said combs rotating in a plane at right angles to the direction in which the sliver is fed and drawn off, a set of picking members, and a needle plate connected with one of said picking members and extending toward said gripping jaws.

In testimony whereof I have signed my name to this specification, in the presence of two subscribing witnesses.

CARL SCHLEIFER.

Witnesses:
  PIERO GIANOLIO,
  JOCELYN GOUBEYRAU.

Copies of this patent may be obtained for five cents each, by addressing the "Commissioner of Patents, Washington, D. C."